Dec. 30, 1969   R. FRANTZ   3,486,536
APPARATUS AND METHOD FOR MANUFACTURING STRUCTURAL COMPONENTS
Filed March 16, 1964   5 Sheets-Sheet 1
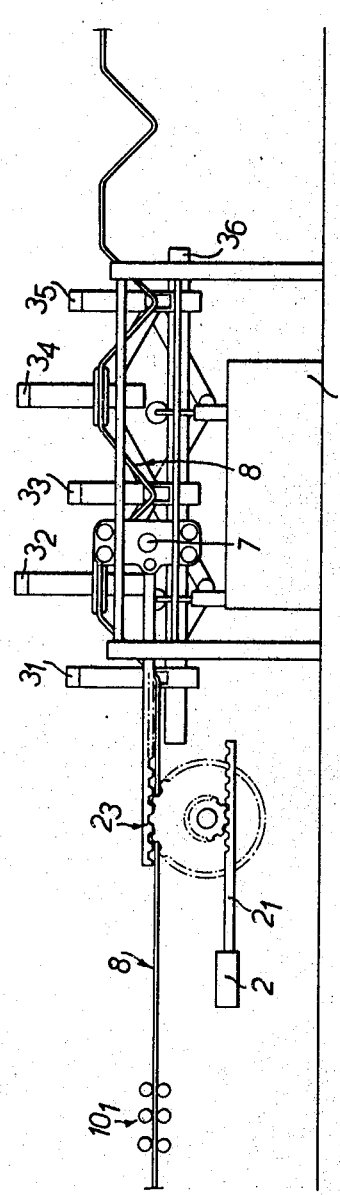
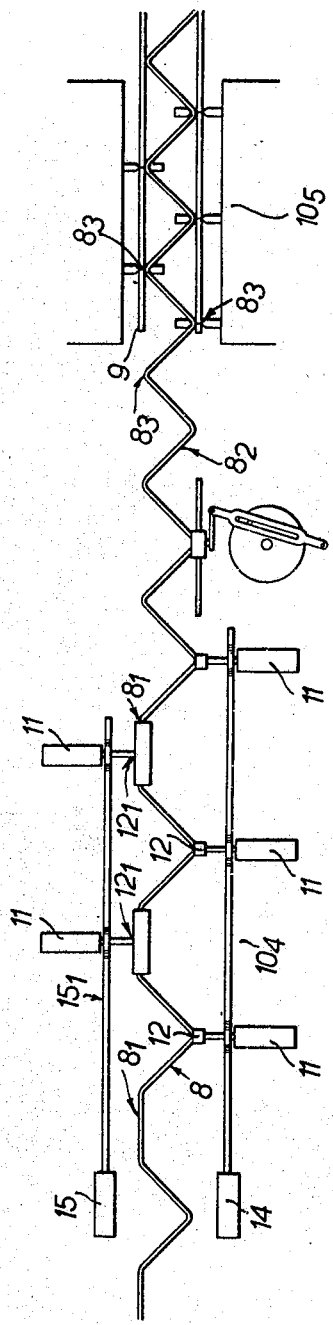
INVENTOR
Rene Frantz
BY Baldwin & Wight
ATTORNEYS

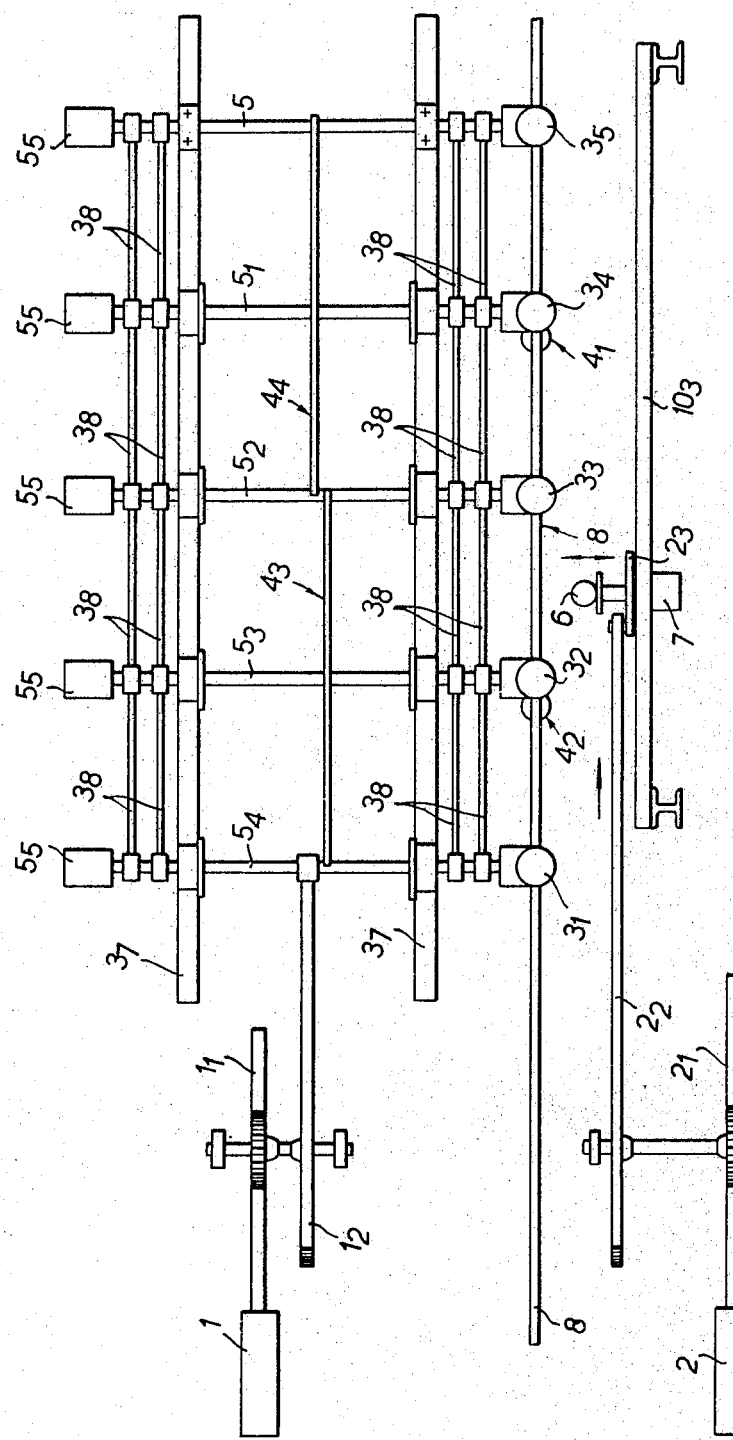

Dec. 30, 1969    R. FRANTZ    3,486,536
APPARATUS AND METHOD FOR MANUFACTURING STRUCTURAL COMPONENTS
Filed March 16, 1964    5 Sheets-Sheet 4
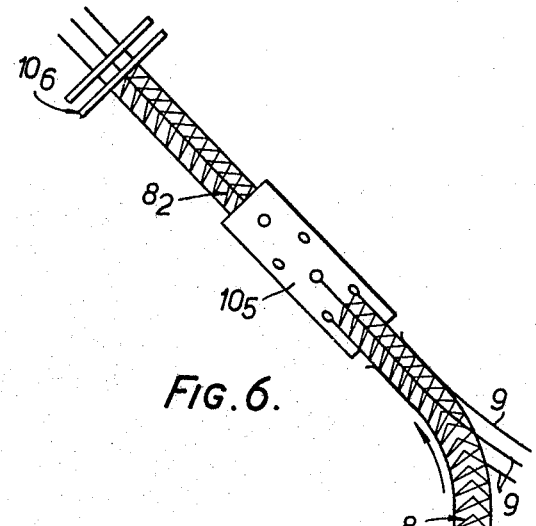
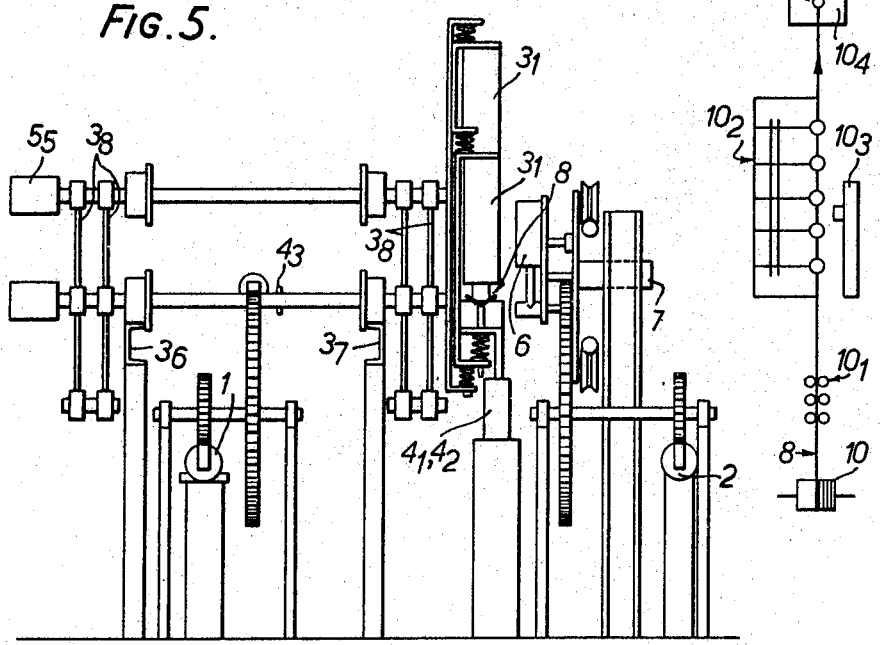
INVENTOR
Rene Frantz
BY Baldwin & Wight
ATTORNEY INVENTOR
Rene Frantz
BY Baldwin & Wight
ATTORNEYS United States Patent Office 3,486,536
Patented Dec. 30, 1969

3,486,536
APPARATUS AND METHOD FOR MANUFACTURING STRUCTURAL COMPONENTS
Rene Frantz, 11 Rue de la Gare, Sarrebourg, Moselle, France
Filed Mar. 16, 1964, Ser. No. 352,377
Claims priority, application France, Mar. 19, 1963, 928,556
Int. Cl. B21f 45/00, 15/08, 27/10
U.S. Cl. 140—71                           25 Claims

ABSTRACT OF THE DISCLOSURE

An elongated metal member, such as a rod, is held at one portion thereof against longitudinal movement, and a compressive force is applied to another portion longitudinally of said member toward the aforesaid one portion thereof, so as to deform the intervening part of the member laterally. Lateral deformation is guided to determine a planar tortuous shape to which the member is deformed. The planar tortuously shaped member may then be deformed transversely to its plane to provide a three dimensional component. Other longitudinal elements may be secured, as by welding, to nodes of the three dimensional component.

Figure 3:
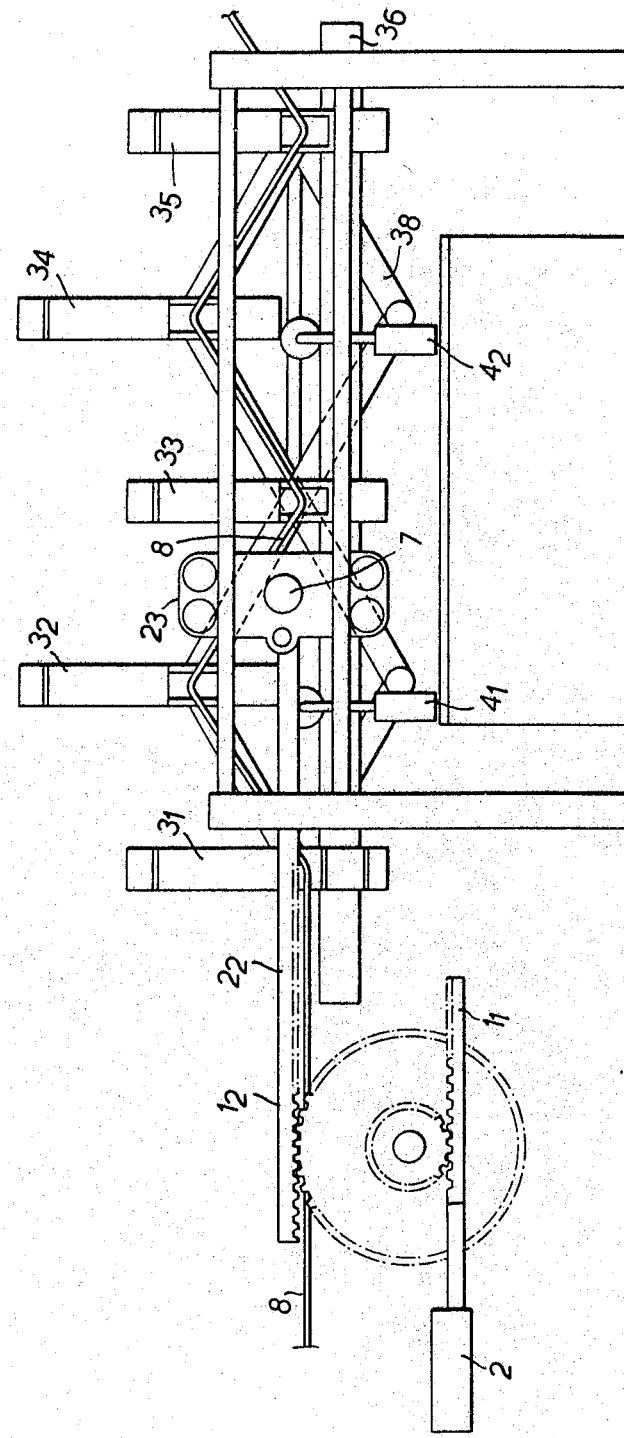

This invention relates to apparatus for and a method of manufacturing structural components, and to structural components made by such a method.

The object of the invention is to produce structural components from material of any convenient cross section, and the cross section of which may conveniently be arranged to provide the necessary strength for any particular installation.

Another object of this invention is to provide a novel apparatus which is particularly adapted to produce structural components, including a means for subjecting a member to a longitudinally compressive force while simultaneously guiding the member at pre-determined positions thereof to deform the member to have a tortuous planar shape, a means for bending portions of the member into a three dimensional configuration, and a means for aligning longitudinally extending elements to respective spaced nodes of the member.

A further object of this invention is to provide a novel method for producing structural components from material of any convenient cross-section, including the steps of subjecting a longitudinally extensive length of material to an end compressive force while simultaneously guiding portions of the material intermediate the ends to deform the material into a tortuous shaped member, and welding longitudinally extensive elements to spaced points throughout the length of the tortuous shaped member.

According to the present invention a method of manufacturing structural metal components includes deforming a metal member of any convenient cross section into a tortous shape by subjecting it to a compression force.

Preferably the first forming action deforms the member in one plane and parts of the member may be subsequently deformed to provide a three dimensional skeleton.

When the components are made as a continuous process the subsequent deforming action is preferably applied to one part of the member simultaneously with the first deforming action to another part and at the same time another portion of the formed member may be attached to one or more longitudinally extending elements, for example by welding.

When the process is continuous the article produced may be severed transversely periodically to produce structural components of required size.

Thus the method may include supplying the metal member as a continuous rod, and performing the various steps simultaneously, then moving the rod towards the last step after each operation.

The invention also includes a structural component made by the method as set forth above.

Apparatus for making a structural metal component according to the invention may include means for applying an end compression force to a longitudinally extending member and means for guiding the deformation thus formed into a predetermined tortuous shape.

Means for deforming the member transversely to form a three dimensional skeleton may also be included as may means for aligning one or more longitudinally extending elements and for welding the deformed member at predetermined points.

Thus the apparatus may be arranged to operate on a metal member in the form of a continuous length of rod, including means for moving the rod from one operation to the next and for performing all the operations on different parts of the rod simultaneously, and these operations may be synchronised by means of a hydraulic, mechanical or electrical system so that a continuous supply of structural components is produced.

The invention may be performed in various ways but a method of, and apparatus for producing two particular structural elements will now be described by way of example and with reference to the accompanying drawings in which FIGURE 1 is a diagrammatic side elevation of a part of the apparatus according to the invention.

Figure 7:
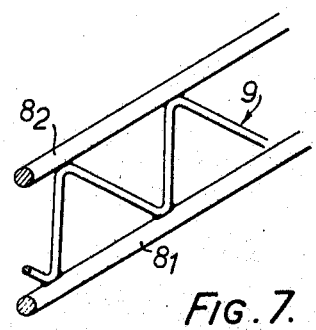
Figure 8:
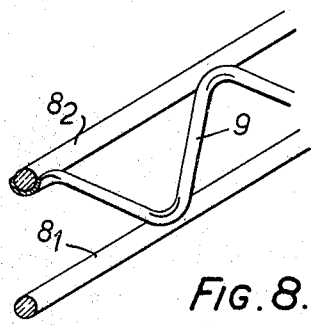
Figure 9:
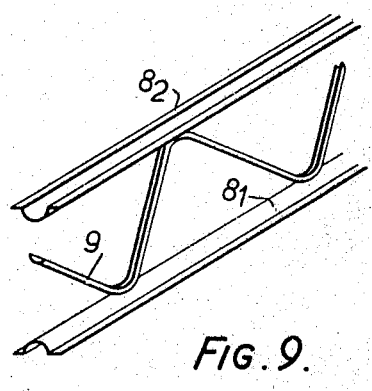
Figure 10:
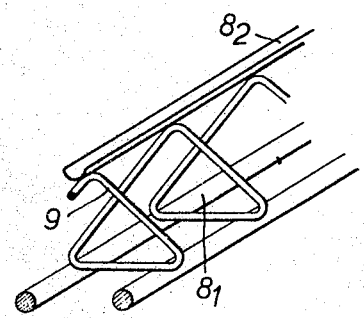
Figure 11:
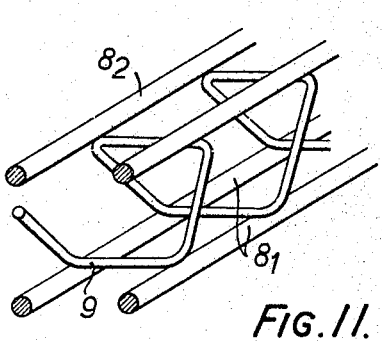
Figure 12:
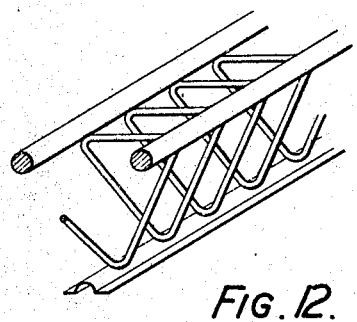

FIGURE 2 is a diagrammatic side view of a further part of the apparatus,

FIGURE 3 is a side view similar to FIGURE 1 but showing apparatus for producing a slightly different component, FIGURE 4 is a plan view of the apparatus shown in FIGURE 3, and, FIGURE 5 is an end elevation of the apparatus shown in FIGURE 3, FIGURE 6 is a diagrammatic plan view showing an installation for manufacturing the metal components, FIGURE 7 is a perspective view of a structural component using a metal member which has been deformed in one plane, FIGURE 8 is a perspective view of a member somewhat similar to FIGURE 7, FIGURE 9 is a perspective view of a similar member using a shaped channel longitudinally extending additional element, FIGURE 10 is a perspective view of a structural component the metal member of which has been deformed in two dimensions to produce a triangular cross section and suitable for use as a flooring girder, FIGURE 11 is a perspective view of a somewhat similar member siutable for use as a reinforcement for concrete, and, FIGURE 12 is a perspective view of a triangular structural beam suitable for use in metallic constructions.

In FIGURES 1 and 2 a metallic member in the form of a rod 8 of any convenient cross section is deformed by compression and the guiding action of guide members in the form of jacks, $3^1$, $3^2$, $3^3$, $3^4$, and $3^5$. These jacks are guided in such a way that they cause the rod 8 to bend in a two dimensional form when an end load is applied to it.

After the first deforming action, as shown in FIGURE 1, the two dimensional member 8 is of the form shown on the right hand side of FIGURE 1. After the operation which is caused by the second deforming apparatus shown on the left hand side of FIGURE 2 a triangular spiral is formed which is indicated at $8^2$ and at this point longitudinally extending outside members 9 are welded to the corners.

It will be appreciated that as the basic material is in rod form the whole process operates continuously and the various operations can be carried out simultaneously on different parts of the member. In this way, two dimensional, that is, without the second stage, or three dimensional triangular or rectangular cross section, components can be produced in a continuous manner and may be used in the manufacture of structural members such as girders, beams or reinforced concrete.

The usual stock material for trellis work may be used and may be in the form of coils of metal rod of any desired cross section, or long strips of flat material, which go forward into the apparatus at a rate which is a multiple of the pitch of the first deformation.

FIGURE 6 shows a typical production line which conists successively of various spools 10 with coils of metal rod of appropriate section, which are passed through a straightening machine $10^1$ to straighten them and clean the metal. The rod passes to the first deforming apparatus $10^2$ and is fed forward by a feeding device $10^3$ to the apparatus for providing the second deformation which forms a three dimensional article at $10^4$. From this station the metal member indicated at $8^2$ passes to a welding station $10^5$ with longitudinally extending elements 9 which are fed from a separate source. In this case three such elements are provided and are attached to each corner skeleton $8^2$.

A cutting machine $10^6$ is provided to cut portions of the article to a desired length and a control system is provided for the operation of the various operative apparatus components so that they are synchronised.

The apparatus $10^2$ which produces the first deformation in the metal rod provides a tortuous shape in the arrangement shown in FIGURE 1 which includes a straight portion in between two V shaped portions, and it is this straight portion which is subsequently deformed in a transverse direction which provides the triangular skeleton.

The apparatus shown in FIGURES 3, 4 and 5 is similar to that shown in FIGURE 1 except that it produces a tortuous shape which is merely of generally sinusoidal form in one plane, though comprising straight line segments. The actual apparatus is however similar and similar reference numerals are used in the figures to indicate similar parts.

The apparatus $10^2$ comprises a bench $3^6$ in the form of a pair of parallel rails $3^7$ on which is secured a fixed shaft 5 provided with a bending head $3^5$. Shafts $5^1$, $5^2$, $5^3$ and $5^4$ identical to the shaft 5 are carried by rollers and can move on the rails $3^7$, as is most clearly shown in FIGURE 4. Pivoted arms $3^8$ connect the shafts together and are connected so that they produce a parallel motion linkage as is most clearly shown in FIGURE 3. The arrangement is such that the shafts $5^4$, $5^2$ and $5^1$ remain in contact with the rails $3^7$ but the shafts $5^3$ and $5^1$ are raised vertically when the shafts are moved towards one another in a longitudinal plane, as the shafts $5^4$, $5^2$ and 5 are connected at the cross points of the pivoted arms $3^8$ and the shafts $5^3$, $5^1$ are connected at their ends. Each shaft $5^4$, $5^3$, $5^2$, $5^1$, 5 carries on one side a bending head having jacks $3^1$, $3^2$, $3^3$, $3^4$ and $3^5$ and at the opposite side a jack $5^5$ which can act to eject the deformed member at the end of each bending cycle. The jacks $3^1$, $3^2$, $3^3$, $3^4$ and $3^5$ are arranged to act vertically and the jacks $5^5$ act horizontally.

Beneath the lowermost position of the jacks $3^2$ and $3^4$ two further jacks $4^1$, $4^2$ are provided which can be operated initially to cause a minor deformation of the member 8 to initiate its forming movement and thereby decrease the strain on the rack bar $1^2$ which is operated by a rack $1^1$ and pinion gear actuated by a jack 1 which causes operation of the parallel motion linkage in a manner to be described. The pivoted arms $3^8$ connected to the various jacks form a parallelogram which causes parallel upward movement of the jacks $3^2$, $3^4$ when the jacks are moved towards one another by means of the ram 1.

Parallel with the deforming apparatus is a feeding device $10^3$ which is controlled in its linear movement by a jack 2 which works through racks $2^1$ and $2^2$ and spur gears to actuate a head $2^3$ which can grip the member 8 in a manner to be described.

The deforming and advancing apparatus are arranged to produce a first deformation of the member 8 and then to advance it to the second operation ($10^4$), and the apparatus $10^2$ can be adjusted to work on rod or flat iron of various widths to produce various angles and shapes as desired.

The advancing device $10^3$ and the action of the jack 2, racks $2^1$ and $2^2$, and spur gears moves a length equal to the bending line between the first and last bends on the element so as to advance the shaped member 8 as desired. For this purpose device $10^3$ is provided with a jack 7 for transverse movements of a holding jack 6 which can be traversed under the action of the jack 7.

When a member 8 has been positioned in line with the jacks $3^1$, $3^2$, $3^3$, $3^4$, and $3^5$ by the jack 6, these jacks grasp the shaped member 8 after the release of the advancing jack 6 which is then moved transversely by the jack 7 so that it is out of the way. When the member has been deformed as required the jacks 7, 6 and 2 are again operated so that the member 8 is advanced the required amount and jacks 6 and 7 are then again withdrawn and the head $2^3$ returned to its initial starting point. In FIGURES 1 and 4 the head $2^3$ is at a mid-position.

With the member 8 grasped by the jacks $3^1$, $3^2$, $3^3$, $3^4$ and $3^5$ the intermediate jacks $4^1$, $4^2$ are operated which cause the jacks $3^2$, $3^4$ to lift slightly and thus commence the bending action. The jack 1 now moves the racks $1^1$ and $1^2$ and spur gears which moves the spindles $5^4$, $5^3$, $5^2$ and $5^1$ via the pivoted arms $3^8$ so that the jacks $3^2$ and $3^4$ are moved upwardly and the jacks $3^1$, $3^3$ and $3^5$ moved towards one another. It will be appreciated that as this movement is caused by the operation of the jack 1, the bending of the member 8 is caused by compression.

The vertical movement of each jack $3^2$, $3^4$ is limited by adjustable stops $4^3$, $4^4$ which act between the axles so that movement of the transverse shaft $5^4$ caused by the rack bar $1^2$ is controlled. It will be appreciated that the amount of bend provided in the member 8 is dependent upon these stops $4^3$, $4^4$ and the angle of bend is thus also controlled.

When the bar is to be bent into an N shape this can be achieved by inclining the jacks $3^1$, $3^2$, $3^3$, $3^4$ and $3^5$ on their axes. With the arrangement shown in FIGURE 3 a simple V shaped bend is achieved in the member 8, but in order to achieve the straight portion as shown in FIGURE 1 it is necessary to provide the jacks $3^2$ and $3^4$ with longitudinal support members around the ends of which the member 8 can bend.

After the forming action of the parallel motion linkage and the jacks the deformed member 8 is ejected from the jacks 3 by the action of the jacks $5^5$ which act transversely on the member. The return action of the jack 1 now returns the parallel motion linkage and the jacks to their original position ready to receive a further length of the member 8 as it is moved into position by the feeding device.

When a structural element such as shown in either of FIGURE 7, 8 or 9 is being made the deformed member as shown in FIGURE 8 can be passed straight to the welding station $10^5$, but when a three dimensional skeleton is formed the member 8 next passes to second deforming apparatus $10^4$ as shown in FIGURE 2. The apparatus for performing the second deformation is synchronised with the apparatus $10^2$ so that the process is continuous.

This apparatus 10⁴ is provided with several rams 11 equipped with jacks 12 which are spaced apart according to the spaces of the member 8, and which act to hold the member 8 in position. Operating jacks 14 and 15 are also provided, and when these are operated the jack 15 moves racks 15¹ so that the heads of the pistons of the jacks 11 which have jaws 12¹ are rotated through an angle of for example 90° so that the straight portion of the member 8 is turned transversely to the length of the member to produce a triangular skeleton comprising straight portions terminating in nodes. If a rectangular skeleton was desired, a lower side of the member 8 will also be provided with straight portions which would be engaged by the jacks 11 and turned in a manner to produce another transverse portion at the end of each sloping portion.

After the turning movement the jacks 11 disengage themselves and return to their initial position ready for the next operation.

As will be clear from FIGURE 2 in the present case in which a triangular skeleton is being produced only the jack 15 is operated to produce the desired effect.

After passing through this second deformation operation the longitudinal elements are welded to the deformed member as set forth above, and in FIGURE 2 the various parts are connected by spot welding members indicated at 8³.

Various types of structural metal component can be made by the apparatus and method described and two of these are shown in FIGURES 7 and 8 which are made with a deformed member 9 and two longitudinal elements of metal rod of circular cross section in the form of another element 8² and lower element 8¹.

Another part is shown in FIGURE 9, in the form of a two dimensional structural member, the lower member 8¹ of which is of omega cross section. In FIGURE 10 a structural member is shown which is of substantially triangular cross section and suitable for use as a flooring girder. This is made from a deformed member 9 in metal of circular cross section of an appropriate diameter and elements 8¹, 8² are also in metal of circular cross section.

In FIGURE 11 a further example is shown of a structural member suitable for use as reinforcement for concrete and which comprises upper elements 8² and lower elements 8¹ which are made of metal rod of circular cross section and a square spiral member 9 of circular cross section metal rod.

FIGURE 12 shows a further example of a structural member for use in metallic construction which is made of a triangular skeleton 9 but the lower longitudinal element is of substantially omega cross section shape to provide a good rigidity for the structural construction.

It will be appreciated that a large number of structural components may be made with this apparatus and that the above arrangements as described are not limiting.

What I claim is:

1. In a method of manufacturing structural metal components from an elongated metal member having two longitudinally spaced portions; holding one of said portions against movement longitudinally with respect to said member; applying compressive force to the other of said portions longitudinally of said member toward said one portion thereof and thereby deforming said member laterally; and guiding lateral deformation of said member to determine formation of a tortuous shape to which said member is deformed.

2. A method of manufacturing structural metal components as claimed in claim 1 wherein said deforming step comprises bending the member in one plane; including the step of subsequently deforming portions of said member to provide a three dimensional skeleton.

3. A method of manufacturing structural metal components as claimed in claim 2 in which the subsequent deforming action is applied to one part of the member simultaneously with the first deforming action to another part.

4. A method of manufacturing structural components as claimed in claim 3 including the step of assisting the compression and deformation of said member by guided jacks.

5. A method of manufacturing structural components as claimed in claim 1 which includes deforming a metal member into a tortuous shape by subjecting it to a compression force and then attaching the member thus formed to at least one longitudinally extending element.

6. A method of manufacturing structural components as claimed in claim 5 in which the member is attached to the elements by welding.

7. A method of manufacturing structural components as claimed in claim 5 in which one part of the formed member is attached to the elements at the same time as another part of the member is being deformed.

8. A method of manufacturing structural components as claimed in claim 7 including the step of severing the deformed component to a predetermined length.

9. A method of manufacturing structural components which includes supplying a metal member in the form of a continuous rod having two longitudinally spaced portions; holding one of said portions against movement longitudinally with respect to said rod; applying compressive force to the other of said portions longitudinally of said rod toward said one portion thereof and thereby deforming said rod laterally; guiding lateral deformation of said member to determine formation of a tortuous shape thereof; then attaching the tortuously shaped member thus formed to at least one longitudinally extending element, said deforming and attaching operations being performed simultaneously on different parts of the rod; and moving the deformed rod towards the attaching operation after each cycle of operation.

10. Apparatus for making a structural metal component from an elongated metal member, said apparatus comprising means for holding one portion of said member against movement longitudinally with respect to said member; means for applying compressive force longitudinally of said member to another portion of said member spaced from said one portion thereof and thereby laterally deforming said member between said portions; and means for guiding the lateral deformation thus formed into a predetermined tortuous shape.

11. Apparatus as claimed in claim 10 in which said guiding means includes a parallel motion linkage which carried guiding jacks particularly adapted to operatively engage the member at predetermined positions.

12. Apparatus as claimed in claim 10 including means for deforming the member transversely to form a three-dimensional skeleton.

13. Apparatus as claimed in claim 12 in which said transverse deforming means compirses one or more pivotal forming members particularly adapted to operatively engage the member and bend it at two points to provide a transversely extending portion between two longitudinally extending portions.

14. Apparatus as claimed in claim 13 including means for aligning at least one longitudinally extending element and for welding said element to said deformed member at predetermined points.

15. Apparatus as claimed in claim 14 including means for cutting said components to a desired length.

16. Apparatus as claimed in claim 14 arranged to operate on a metal member in the form of a continuous length of rod, including means for moving said rod from one operation to the next and for performing all said operations on different parts of the rod simultaneously.

17. Apparatus as claimed in claim 16 in which said various operations are synchronised so that a continuous supply of structural components is produced.

18. Apparatus for making structural components which comprises a straightening means for straightening metal rod from a spool; means for holding one portion of said rod against movement longitudinally with respect to said rod; means for applying compressive force longitudinally of said rod to another and spaced portion thereof thereby to deform said rod between said portions into a two dimensional tortuous shape; means for subsequently deforming said rod to provide a three dimensional skeleton; a feeding means for moving the rod through the apparatus; a welding means for welding longitudinally extending elements to said three dimensioned skeleton; and a cutting means for cutting lengths of the article produced to form structural components.

19. Apparatus for making a structural component from an elongated metal member, said apparatus comprising means for holding one portion of said member against movement longitudinally with respect to said member; means for applying compressive force longitudinally of said member to another portion of said member spaced from said one portion thereof and thereby laterally deforming said member between said portions; and means for aligning at least one longitudinally extending element and for attaching said element to said deformed member at predetermined points.

20. Apparatus as claimed in claim 19 including means for cutting said component to a desired length.

21. Apparatus as claimed in claim 20 arranged to operate on a metal member in the form of a continuous length of rod, including means for moving said rod from one operation to the next and for performing all said operations on different parts of the rod simultaneously.

22. A method of manufacturing structural components including the steps of:
   (1) supplying a continuous length of metal stock material;
   (2) deforming the material between two longitudinally spaced portions thereof into a planar tortuous shaped member by:
      (a) holding one of said portions against movement longitudinally with respect to said length,
      (b) applying compressive force to the other of said portions longitudinally of said length toward said one portion thereof and thereby deforming said length laterally, and
      (c) guiding lateral deformation of said length to determine the tortuous shape of said member;
   (3) deforming the tortuous shape member by bending portions thereof into a predetermined three dimensional configuration having nodes between straight line portions thereof;
   (4) placing longitudinally extensive elements adjacent aligned nodes of said member;
   (5) welding said elements to respective nodes of said member; and
   (6) cutting the member and attached elements into predetermined lengths.

23. Apparatus for making structural components comprising:
   (1) means for supplying a continuous length of metal stock material;
   (2) means for deforming the material into a planar tortuous shaped member between two longitudinally spaced portions thereof, including:
      (a) means for holding one portion of said length against longitudinal movement with respect to said length, and
      (b) means for applying compressive force longitudinally to another portion of said length spaced from said one portion thereof and thereby deforming said length between said portions thereof into said planar tortuous shape;
   (3) means for deforming the tortuous shaped member by bending portions thereof into a predetermined three dimensional configuration having nodes between straight line portions thereof;
   (4) means for placing longitudinally extensive elements adjacent aligned nodes of said member;
   (5) means for welding said elements to respective nodes of said member; and
   (6) means for cutting the member and attached elements into predetermined lengths.

24. Apparatus as claimed in claim 11 wherein said linkage comprises a plurality of hingedly mounted elements movable longitudinally of the direction of feed of said member.

25. Apparatus as claimed in claim 24 wherein said guiding jacks are movable transversely of the longitudinal direction of feed of said member.

References Cited

UNITED STATES PATENTS

| | | | |
|---|---|---|---|
| 2,086,736 | 7/1937 | Palmer | 72—385 |
| 2,744,546 | 5/1956 | Williams | 140—71 |
| 2,792,852 | 5/1957 | Talbot et al. | 140—112 |
| 3,192,963 | 7/1965 | Barbou | 140—112 |

CHARLES W. LANHAM, Primary Examiner

LOWELL A. LARSON, Assistant Examiner

U.S. Cl. X.R.

140—112